(12) United States Patent
Holcomb et al.

(10) Patent No.: US 8,325,800 B2
(45) Date of Patent: Dec. 4, 2012

(54) ENCODING STREAMING MEDIA AS A HIGH BIT RATE LAYER, A LOW BIT RATE LAYER, AND ONE OR MORE INTERMEDIATE BIT RATE LAYERS

(75) Inventors: Thomas W. Holcomb, Bothell, WA (US); Sanjeev Mehrotra, Kirkland, WA (US); Serge Smirnov, Redmond, WA (US); Bharath Siravara, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1155 days.

(21) Appl. No.: 12/116,878

(22) Filed: May 7, 2008

(65) Prior Publication Data

US 2009/0279605 A1    Nov. 12, 2009

(51) Int. Cl.
 *H04N 7/12*  (2006.01)
 *H04N 11/02* (2006.01)
 *H04N 11/04* (2006.01)
(52) U.S. Cl. ............................... 375/240.03
(58) Field of Classification Search ............ None
 See application file for complete search history.

(56) References Cited

U.S. PATENT DOCUMENTS

| | | | |
|---|---|---|---|
| 4,051,470 A | 9/1977 | Esteban et al. |
| 4,454,546 A | 6/1984 | Mori |
| 4,493,091 A | 1/1985 | Gundry |
| 4,706,260 A | 11/1987 | Fedele et al. |
| 4,802,224 A | 1/1989 | Shiraki et al. |
| 4,954,892 A | 9/1990 | Asai et al. |
| 5,043,919 A | 8/1991 | Callaway et al. |
| 5,089,889 A | 2/1992 | Sugiyama |
| 5,136,377 A | 8/1992 | Johnston et al. |
| 5,235,618 A | 8/1993 | Sakai et al. |
| 5,262,964 A | 11/1993 | Bonsall et al. |
| 5,266,941 A | 11/1993 | Akeley et al. |

(Continued)

FOREIGN PATENT DOCUMENTS

JP    2008-523687    7/2008

(Continued)

OTHER PUBLICATIONS

Hsu et al., Rate Control for Robust Video Transmission over Burst-Error Wireless Channels, May 1999, IEEE Journal on Selected Areas in Communications, vol. 17, No. 5.*

(Continued)

*Primary Examiner* — Ayaz Sheikh
*Assistant Examiner* — Peter Chau
(74) *Attorney, Agent, or Firm* — Klarquist Sparkman, LLP

(57) ABSTRACT

A method of encoding an input video stream comprising a video component and an audio component is disclosed. The input video stream is split into a plurality of segments, each comprising a plurality of frames. Each of the segments is encoded as a low bit rate layer, a high bit rate layer, and one or more intermediate bit rate layers. The bit rate of the low bit rate layer is selected such that a network streaming the segment will always be able to stream the segment encoded as the low bit rate layer. The bit rate of the high bit rate layer is selected such that the segment is able to be decoded and played back at or above a quality threshold. The bit rates of the intermediate bit rate layers are produced by applying a bit rate factor to another bit rate.

24 Claims, 5 Drawing Sheets

U.S. PATENT DOCUMENTS

| | | | |
|---|---|---|---|
| 5,317,672 A | 5/1994 | Crossman et al. | |
| 5,394,170 A | 2/1995 | Akeley et al. | |
| 5,398,069 A | 3/1995 | Huang et al. | |
| 5,400,371 A | 3/1995 | Natarajan | |
| 5,414,796 A | 5/1995 | Jacobs et al. | |
| 5,448,297 A | 9/1995 | Alattar et al. | |
| 5,457,495 A | 10/1995 | Hartung | |
| 5,467,134 A | 11/1995 | Laney et al. | |
| 5,533,052 A | 7/1996 | Bhaskar | |
| 5,570,363 A | 10/1996 | Holm | |
| 5,579,430 A | 11/1996 | Grill et al. | |
| 5,586,200 A | 12/1996 | Devaney et al. | |
| 5,602,959 A | 2/1997 | Bergstrom et al. | |
| 5,623,424 A | 4/1997 | Azadegan et al. | |
| 5,627,938 A | 5/1997 | Johnston | |
| 5,650,860 A | 7/1997 | Uz | |
| 5,654,760 A | 8/1997 | Ohtsuki | |
| 5,661,755 A | 8/1997 | Van De Kerkhof et al. | |
| 5,666,161 A | 9/1997 | Kohiyama et al. | |
| 5,686,964 A | 11/1997 | Tabatabai et al. | |
| 5,724,453 A | 3/1998 | Ratnakar et al. | |
| 5,742,735 A | 4/1998 | Eberlein et al. | |
| 5,754,974 A | 5/1998 | Griffin et al. | |
| 5,787,203 A | 7/1998 | Lee et al. | |
| 5,802,213 A | 9/1998 | Gardos | |
| 5,819,215 A | 10/1998 | Dobson et al. | |
| 5,825,310 A | 10/1998 | Tsutsui | |
| 5,835,149 A | 11/1998 | Astle | |
| 5,835,495 A | 11/1998 | Ferriere | |
| 5,845,243 A | 12/1998 | Smart et al. | |
| 5,867,230 A | 2/1999 | Wang et al. | |
| 5,884,039 A | 3/1999 | Ludwig et al. | |
| 5,886,276 A | 3/1999 | Levine et al. | |
| 5,903,892 A | 5/1999 | Hoffert et al. | |
| 5,917,830 A | 6/1999 | Chen et al. | |
| 5,926,226 A | 7/1999 | Proctor et al. | |
| 5,933,451 A | 8/1999 | Ozkan et al. | |
| 5,952,943 A | 9/1999 | Walsh et al. | |
| 5,982,305 A | 11/1999 | Taylor | |
| 5,986,712 A | 11/1999 | Peterson et al. | |
| 5,987,376 A | 11/1999 | Olson et al. | |
| 5,990,945 A | 11/1999 | Sinha et al. | |
| 5,995,151 A | 11/1999 | Naveen et al. | |
| 6,000,053 A | 12/1999 | Levine et al. | |
| 6,002,439 A | 12/1999 | Murakami et al. | |
| 6,006,241 A | 12/1999 | Purnaveja et al. | |
| 6,014,706 A | 1/2000 | Cannon et al. | |
| 6,029,126 A | 2/2000 | Malvar | |
| 6,041,345 A | 3/2000 | Levi et al. | |
| 6,049,630 A | 4/2000 | Wang et al. | |
| 6,058,362 A | 5/2000 | Malvar | |
| 6,072,831 A | 6/2000 | Chen | |
| 6,073,153 A | 6/2000 | Malvar | |
| 6,075,768 A | 6/2000 | Mishra | |
| 6,081,554 A | 6/2000 | Lee et al. | |
| 6,088,392 A | 7/2000 | Rosenberg | |
| 6,108,382 A | 8/2000 | Gringeri et al. | |
| 6,111,914 A | 8/2000 | Bist | |
| 6,115,689 A | 9/2000 | Malvar | |
| 6,141,053 A | 10/2000 | Saukkonen | |
| 6,160,846 A | 12/2000 | Chiang et al. | |
| 6,167,162 A | 12/2000 | Jacquin et al. | |
| 6,182,034 B1 | 1/2001 | Malvar | |
| 6,192,075 B1 | 2/2001 | Jeng | |
| 6,212,232 B1 | 4/2001 | Reed et al. | |
| 6,215,820 B1 | 4/2001 | Bagni et al. | |
| 6,223,162 B1 | 4/2001 | Chen et al. | |
| 6,226,407 B1 | 5/2001 | Zabih et al. | |
| 6,240,380 B1 | 5/2001 | Malvar | |
| 6,243,497 B1 | 6/2001 | Chiang et al. | |
| 6,259,739 B1 | 7/2001 | Kondo | |
| 6,278,735 B1 | 8/2001 | Mohsenian | |
| 6,311,209 B1 | 10/2001 | Olson et al. | |
| 6,320,825 B1 | 11/2001 | Bruekers et al. | |
| 6,339,794 B2 | 1/2002 | Bolosky et al. | |
| 6,351,226 B1 | 2/2002 | Saunders et al. | |
| 6,370,502 B1 | 4/2002 | Wu et al. | |
| 6,421,738 B1 | 7/2002 | Ratan et al. | |
| 6,421,739 B1 | 7/2002 | Holiday | |
| 6,433,795 B1 | 8/2002 | MacNaughton et al. | |
| 6,441,754 B1 | 8/2002 | Wang et al. | |
| 6,466,987 B2 | 10/2002 | Bolosky et al. | |
| 6,473,409 B1 | 10/2002 | Malvar | |
| 6,490,554 B2 | 12/2002 | Endo et al. | |
| 6,493,388 B1 | 12/2002 | Wang | |
| 6,501,797 B1 * | 12/2002 | van der Schaar et al. | 375/240.12 |
| 6,501,798 B1 | 12/2002 | Sivan | |
| 6,522,693 B2 | 2/2003 | Lu et al. | |
| 6,539,124 B2 | 3/2003 | Sethuraman et al. | |
| 6,560,636 B2 | 5/2003 | Cohen et al. | |
| 6,573,915 B1 | 6/2003 | Sivan et al. | |
| 6,574,593 B1 | 6/2003 | Gao et al. | |
| 6,625,321 B1 | 9/2003 | Li et al. | |
| 6,628,712 B1 | 9/2003 | Le Maguet | |
| 6,646,195 B1 | 11/2003 | Puryear | |
| 6,654,417 B1 | 11/2003 | Hui | |
| 6,654,419 B1 | 11/2003 | Sriram et al. | |
| 6,654,790 B2 | 11/2003 | Ogle et al. | |
| 6,675,199 B1 | 1/2004 | Mohammed et al. | |
| 6,697,072 B2 | 2/2004 | Russell et al. | |
| 6,704,813 B2 | 3/2004 | Smirnov et al. | |
| 6,728,317 B1 | 4/2004 | Demos | |
| 6,732,071 B2 | 5/2004 | Lopez-Estrada et al. | |
| 6,745,364 B2 | 6/2004 | Bhatt et al. | |
| 6,754,715 B1 | 6/2004 | Cannon et al. | |
| 6,760,482 B1 | 7/2004 | Taubman | |
| 6,760,598 B1 | 7/2004 | Kurjenniemi | |
| 6,763,374 B1 | 7/2004 | Levi et al. | |
| 6,789,123 B2 | 9/2004 | Li et al. | |
| 6,792,449 B2 | 9/2004 | Colville et al. | |
| 6,801,947 B1 | 10/2004 | Li | |
| 6,810,083 B2 | 10/2004 | Chen et al. | |
| 6,836,791 B1 | 12/2004 | Levi et al. | |
| 6,876,703 B2 | 4/2005 | Ismaeil et al. | |
| 6,885,471 B1 | 4/2005 | Minowa et al. | |
| 6,895,050 B2 | 5/2005 | Lee | |
| 6,934,677 B2 | 8/2005 | Chen et al. | |
| 6,937,770 B1 | 8/2005 | Oguz et al. | |
| 6,961,631 B1 | 11/2005 | Puryear | |
| 6,968,364 B1 | 11/2005 | Wong et al. | |
| 6,974,901 B2 | 12/2005 | Puryear | |
| 6,980,695 B2 | 12/2005 | Mehrotra | |
| 7,016,409 B2 | 3/2006 | Unger | |
| 7,023,915 B2 | 4/2006 | Pian | |
| 7,027,982 B2 | 4/2006 | Chen et al. | |
| 7,031,700 B1 | 4/2006 | Weaver et al. | |
| 7,046,805 B2 | 5/2006 | Fitzhardinge et al. | |
| 7,054,365 B2 | 5/2006 | Kim et al. | |
| 7,054,774 B2 | 5/2006 | Batterberry et al. | |
| 7,072,973 B1 | 7/2006 | Newson et al. | |
| 7,107,606 B2 | 9/2006 | Lee | |
| 7,111,044 B2 | 9/2006 | Lee | |
| 7,124,164 B1 | 10/2006 | Chemtob | |
| 7,143,030 B2 | 11/2006 | Chen et al. | |
| 7,146,313 B2 | 12/2006 | Chen et al. | |
| 7,149,247 B2 | 12/2006 | Sullivan | |
| 7,151,749 B2 | 12/2006 | Vega-Garcia et al. | |
| 7,162,533 B2 | 1/2007 | Klemets | |
| 7,174,384 B2 | 2/2007 | Cheung | |
| 7,174,385 B2 | 2/2007 | Li | |
| 7,176,957 B2 | 2/2007 | Ivashin et al. | |
| 7,177,642 B2 | 2/2007 | Sanchez Herrero et al. | |
| 7,184,959 B2 | 2/2007 | Gibbon et al. | |
| 7,190,670 B2 | 3/2007 | Varsa et al. | |
| 7,206,822 B2 | 4/2007 | Levi et al. | |
| 7,206,854 B2 | 4/2007 | Kauffman et al. | |
| 7,248,740 B2 | 7/2007 | Sullivan | |
| 7,260,525 B2 | 8/2007 | Chen et al. | |
| 7,263,482 B2 | 8/2007 | Chen et al. | |
| 7,266,613 B1 | 9/2007 | Brown et al. | |
| 7,283,881 B2 | 10/2007 | Puryear | |
| 7,283,966 B2 | 10/2007 | Zhang et al. | |
| 7,286,748 B2 | 10/2007 | Srinivasan et al. | |
| 7,296,063 B2 | 11/2007 | Levi et al. | |
| 7,302,490 B1 | 11/2007 | Gupta et al. | |
| 7,313,236 B2 | 12/2007 | Amini et al. | |

| | | |
|---|---|---|
| 7,313,755 B2 | 12/2007 | Rahman et al. |
| 7,342,924 B2 | 3/2008 | Levi et al. |
| 7,343,291 B2 | 3/2008 | Thumpudi et al. |
| 7,346,007 B2 | 3/2008 | Curcio et al. |
| 7,348,483 B2 | 3/2008 | Puryear |
| 7,359,955 B2 | 4/2008 | Menon et al. |
| 7,360,230 B1 | 4/2008 | Paz et al. |
| 7,365,752 B2 | 4/2008 | Xie |
| 7,383,180 B2 | 6/2008 | Thumpudi et al. |
| 7,391,717 B2 | 6/2008 | Klemets et al. |
| 7,392,316 B2 | 6/2008 | Klemets et al. |
| 7,401,221 B2 | 7/2008 | Adent et al. |
| 7,409,145 B2 | 8/2008 | Antoun et al. |
| 7,424,730 B2 | 9/2008 | Chou |
| 7,433,746 B2 | 10/2008 | Puryear |
| 7,444,419 B2 | 10/2008 | Green |
| 7,451,229 B2 | 11/2008 | Klemets et al. |
| 7,466,721 B2 | 12/2008 | Levi et al. |
| 7,472,198 B2 | 12/2008 | Gupta et al. |
| 7,480,382 B2 | 1/2009 | Dunbar et al. |
| 7,483,532 B2 | 1/2009 | Alkove et al. |
| 7,492,769 B2 | 2/2009 | Klemets |
| 7,493,644 B1 | 2/2009 | Tanskanen |
| 7,505,485 B2 | 3/2009 | Sullivan et al. |
| 7,528,314 B2 | 5/2009 | Puryear |
| 7,529,541 B2 | 5/2009 | Cho et al. |
| 7,536,469 B2 | 5/2009 | Chou et al. |
| 7,538,267 B2 | 5/2009 | Puryear |
| 7,552,227 B2 | 6/2009 | Wang |
| 7,554,922 B2 | 6/2009 | Vega-Garcia et al. |
| 7,555,464 B2 | 6/2009 | Candelore |
| 7,558,472 B2 | 7/2009 | Locket et al. |
| 7,565,429 B1 | 7/2009 | Fernandez |
| 7,581,255 B2 | 8/2009 | Alkove et al. |
| 7,603,387 B2 | 10/2009 | Gates et al. |
| 7,631,015 B2 | 12/2009 | Gupta et al. |
| 7,631,039 B2 | 12/2009 | Eisenberg |
| 7,633,005 B2 | 12/2009 | Puryear |
| 7,644,172 B2 | 1/2010 | Stewart et al. |
| 7,663,049 B2 | 2/2010 | Puryear |
| 7,667,121 B2 | 2/2010 | Puryear |
| 7,672,743 B2 | 3/2010 | Messer et al. |
| 7,673,306 B2 | 3/2010 | Puryear |
| 7,673,315 B1 | 3/2010 | Wong et al. |
| 7,676,495 B2 | 3/2010 | Qian |
| 7,684,566 B2 | 3/2010 | Oliveira et al. |
| 7,720,908 B1 | 5/2010 | Newson et al. |
| 7,725,557 B2 | 5/2010 | Klemets et al. |
| 7,761,609 B1 | 7/2010 | Srinivasan et al. |
| 7,769,880 B2 | 8/2010 | Paka et al. |
| 7,783,772 B2 | 8/2010 | Klemets |
| 7,783,773 B2 | 8/2010 | Wu et al. |
| 7,809,851 B2 | 10/2010 | Klemets |
| 7,839,895 B2 | 11/2010 | Sullivan et al. |
| 7,860,996 B2 | 12/2010 | Musayev et al. |
| 7,873,040 B2 | 1/2011 | Karlsgodt |
| 2002/0073084 A1 | 6/2002 | Kauffman et al. |
| 2002/0087634 A1 | 7/2002 | Ogle et al. |
| 2002/0095332 A1 | 7/2002 | Doherty et al. |
| 2002/0118809 A1 | 8/2002 | Eisenberg |
| 2002/0122491 A1 | 9/2002 | Karcewicz et al. |
| 2002/0133547 A1 | 9/2002 | Lin et al. |
| 2002/0136406 A1 | 9/2002 | Fitzhardinge et al. |
| 2002/0138619 A1 | 9/2002 | Ramaley et al. |
| 2002/0143556 A1 | 10/2002 | Kadatch |
| 2002/0146102 A1 | 10/2002 | Lang |
| 2002/0154693 A1 | 10/2002 | Demos |
| 2002/0176624 A1 | 11/2002 | Kostrzewski et al. |
| 2002/0178138 A1 | 11/2002 | Ender et al. |
| 2002/0184391 A1 | 12/2002 | Phillips |
| 2002/0194608 A1 | 12/2002 | Goldhor |
| 2003/0007464 A1 | 1/2003 | Balani |
| 2003/0037103 A1 | 2/2003 | Salmi et al. |
| 2003/0055995 A1 | 3/2003 | Ala-Honkola |
| 2003/0061607 A1 | 3/2003 | Hunter et al. |
| 2003/0072370 A1* | 4/2003 | Girod et al. ............... 375/240.13 |
| 2003/0078972 A1 | 4/2003 | Tapissier et al. |
| 2003/0093530 A1 | 5/2003 | Syed |
| 2003/0110236 A1 | 6/2003 | Yang et al. |
| 2003/0115041 A1 | 6/2003 | Chen |
| 2003/0115042 A1 | 6/2003 | Chen |
| 2003/0115050 A1 | 6/2003 | Chen |
| 2003/0115051 A1 | 6/2003 | Chen |
| 2003/0115052 A1 | 6/2003 | Chen |
| 2003/0125932 A1 | 7/2003 | Wang et al. |
| 2003/0172131 A1 | 9/2003 | Ao |
| 2003/0220972 A1 | 11/2003 | Montet et al. |
| 2003/0236905 A1 | 12/2003 | Choi et al. |
| 2003/0236906 A1 | 12/2003 | Klemets et al. |
| 2004/0098748 A1 | 5/2004 | Bo et al. |
| 2004/0117427 A1 | 6/2004 | Allen et al. |
| 2004/0131340 A1 | 7/2004 | Antoun et al. |
| 2004/0172478 A1 | 9/2004 | Jacobs |
| 2004/0268397 A1 | 12/2004 | Dunbar et al. |
| 2005/0002453 A1 | 1/2005 | Chang et al. |
| 2005/0009520 A1 | 1/2005 | Herrero et al. |
| 2005/0015259 A1 | 1/2005 | Thumpudi et al. |
| 2005/0015528 A1 | 1/2005 | Du |
| 2005/0016363 A1 | 1/2005 | Puryear |
| 2005/0024487 A1 | 2/2005 | Chen |
| 2005/0047503 A1 | 3/2005 | Han et al. |
| 2005/0050152 A1 | 3/2005 | Penner et al. |
| 2005/0066063 A1 | 3/2005 | Grigorovitch |
| 2005/0076039 A1 | 4/2005 | Ludwig et al. |
| 2005/0076136 A1 | 4/2005 | Cho |
| 2005/0084015 A1 | 4/2005 | Han et al. |
| 2005/0084166 A1 | 4/2005 | Boneh et al. |
| 2005/0105815 A1 | 5/2005 | Zhang et al. |
| 2005/0117641 A1* | 6/2005 | Xu et al. ............... 375/240.08 |
| 2005/0123058 A1 | 6/2005 | Greenbaum |
| 2005/0135484 A1 | 6/2005 | Lee |
| 2005/0157784 A1 | 7/2005 | Tanizawa et al. |
| 2005/0204385 A1 | 9/2005 | Sull et al. |
| 2005/0207734 A1 | 9/2005 | Howell |
| 2005/0234731 A1 | 10/2005 | Sirivara et al. |
| 2005/0234858 A1 | 10/2005 | Torii et al. |
| 2005/0246384 A1 | 11/2005 | Foehr et al. |
| 2005/0254508 A1 | 11/2005 | Aksu et al. |
| 2005/0267994 A1 | 12/2005 | Wong et al. |
| 2006/0015637 A1 | 1/2006 | Chung |
| 2006/0026294 A1 | 2/2006 | Virdi |
| 2006/0029065 A1 | 2/2006 | Fellman |
| 2006/0047779 A1 | 3/2006 | Deshpande |
| 2006/0062302 A1 | 3/2006 | Yin et al. |
| 2006/0088094 A1 | 4/2006 | Cieplinski |
| 2006/0126713 A1 | 6/2006 | Chou et al. |
| 2006/0136597 A1 | 6/2006 | Shabtai et al. |
| 2006/0156363 A1 | 7/2006 | Wu et al. |
| 2006/0165166 A1 | 7/2006 | Chou |
| 2006/0184697 A1 | 8/2006 | Virdi |
| 2006/0218264 A1 | 9/2006 | Ogawa et al. |
| 2006/0235883 A1 | 10/2006 | Krebs et al. |
| 2006/0242080 A1 | 10/2006 | Van Dyke et al. |
| 2006/0242315 A1 | 10/2006 | Nichols |
| 2006/0248570 A1 | 11/2006 | Witwer |
| 2006/0270404 A1 | 11/2006 | Tuohino et al. |
| 2006/0282540 A1 | 12/2006 | Tanimoto |
| 2006/0282566 A1 | 12/2006 | Virdi et al. |
| 2006/0288099 A1 | 12/2006 | Jefferson et al. |
| 2007/0006064 A1 | 1/2007 | Colle |
| 2007/0037599 A1 | 2/2007 | Tillet et al. |
| 2007/0038873 A1 | 2/2007 | Oliveira et al. |
| 2007/0058926 A1 | 3/2007 | Virdi |
| 2007/0078768 A1 | 4/2007 | Dawson |
| 2007/0081586 A1 | 4/2007 | Raveendran et al. |
| 2007/0083886 A1 | 4/2007 | Kauffman et al. |
| 2007/0097816 A1 | 5/2007 | Van Gassel |
| 2007/0100891 A1 | 5/2007 | Nee |
| 2007/0192789 A1 | 8/2007 | Medford |
| 2007/0204321 A1 | 8/2007 | Shen et al. |
| 2007/0274383 A1 | 11/2007 | Yu et al. |
| 2007/0276954 A1 | 11/2007 | Chan et al. |
| 2008/0022005 A1 | 1/2008 | Wu et al. |
| 2008/0037954 A1 | 2/2008 | Lee |
| 2008/0046939 A1 | 2/2008 | Lu et al. |
| 2008/0060029 A1 | 3/2008 | Park et al. |
| 2008/0086570 A1 | 4/2008 | Dey et al. |
| 2008/0091838 A1 | 4/2008 | Miceli |

| | | |
|---|---|---|
| 2008/0172441 A1 | 7/2008 | Speicher |
| 2008/0195743 A1* | 8/2008 | Brueck et al. .................. 709/231 |
| 2008/0195744 A1 | 8/2008 | Bowra |
| 2008/0195761 A1 | 8/2008 | Jabri et al. |
| 2008/0201386 A1 | 8/2008 | Maharajh et al. |
| 2008/0211901 A1 | 9/2008 | Civanlar et al. |
| 2008/0256085 A1 | 10/2008 | Lee et al. |
| 2008/0312923 A1 | 12/2008 | Crinon et al. |
| 2009/0006538 A1 | 1/2009 | Risney et al. |
| 2009/0007171 A1 | 1/2009 | Casey et al. |
| 2009/0043657 A1 | 2/2009 | Swift et al. |
| 2009/0043906 A1 | 2/2009 | Hurst et al. |
| 2009/0049186 A1 | 2/2009 | Agnihotri et al. |
| 2009/0055417 A1 | 2/2009 | Hannuksela |
| 2009/0076904 A1 | 3/2009 | Serena |
| 2009/0089401 A1 | 4/2009 | Zhang et al. |
| 2009/0132356 A1 | 5/2009 | Booth et al. |
| 2009/0132599 A1 | 5/2009 | Soroushian et al. |
| 2009/0132721 A1 | 5/2009 | Soroushian et al. |
| 2009/0199236 A1 | 8/2009 | Barrett et al. |
| 2009/0254672 A1 | 10/2009 | Zhang |
| 2009/0279605 A1 | 11/2009 | Holcomb et al. |
| 2009/0282162 A1 | 11/2009 | Mehrotra et al. |
| 2009/0282475 A1 | 11/2009 | George et al. |
| 2009/0297123 A1 | 12/2009 | Virdi et al. |
| 2009/0300145 A1 | 12/2009 | Musayev et al. |
| 2009/0300203 A1 | 12/2009 | Virdi et al. |
| 2009/0300204 A1 | 12/2009 | Zhang et al. |
| 2009/0319681 A1 | 12/2009 | Freelander et al. |
| 2009/0328124 A1 | 12/2009 | Khouzam et al. |
| 2010/0011119 A1 | 1/2010 | Knowlton et al. |
| 2010/0058061 A1 | 3/2010 | Folta et al. |
| 2010/0080290 A1 | 4/2010 | Mehrotra |
| 2010/0114921 A1 | 5/2010 | Bocharov et al. |
| 2010/0135636 A1 | 6/2010 | Zhang et al. |
| 2010/0153988 A1 | 6/2010 | Takai et al. |
| 2010/0158101 A1 | 6/2010 | Wu et al. |
| 2010/0180011 A1 | 7/2010 | Sood et al. |
| 2010/0189183 A1 | 7/2010 | Gu et al. |
| 2010/0191974 A1 | 7/2010 | Dubhashi et al. |
| 2010/0235472 A1 | 9/2010 | Sood et al. |
| 2010/0235528 A1 | 9/2010 | Bocharov et al. |

FOREIGN PATENT DOCUMENTS

| | | |
|---|---|---|
| WO | WO 2007/058515 | 5/2007 |

OTHER PUBLICATIONS

Jenkac et al., "On Video Streaming over Variable Bit-rate and Wireless Channels," presented at Packet Video 2003, Nantes, France, Apr. 28-29, 2003, 11 pp.
Barker et al., "Dynamic Programmed Based Smoothing of VBR Video Traffic," (Mar. 6, 2002) 10 pages. http://amp.ece.cmu.edu/packetvideo2002/papers/66-ixenanaxio.pdf.
Rexord et al., "Online Smoothing of Live, Variable-Bit-Rate Video," (1997 IEEE) pp. 235-243. http://ieeexplor.ieee.org/Xplore/login.jsp?url=/iel3/4971/13667/00629390.pdf?arnumber=629390.
Caetano et al., "Rate Control Strategy for Embedded Wavelet Video Coders," *Electronic Letters*, pp. 1815-1817 (Oct. 14, 1999).
Cheung et al., "A Comparison of Scalar Quantization Strategies for Noisy Data Channel Data Transmission," *IEEE Transactions on Communications*, vol. 43, No. 2/3/4, pp. 738-742 (Apr. 1995).
Crisafulli et al., "Adaptive Quantization: Solution via Nonadaptive Linear Control," *IEEE Transactions on Communications*, vol. 41, pp. 741-748 (May 1993).
Dalgic et al., "Characterization of Quality and Traffic for Various Video Encoding Schemes and Various Encoder Control Schemes," Technical Report No. CSL-TR-96-701 (Aug. 1996).
Dolby Laboratories, "AAC Technology," 4 pp. [Downloaded from the web site aac-audio.com on World Wide Web on Nov. 21, 2001].
Fraunhofer-Gesellschaft, "MPEG Audio Layer-3," 4 pp. [Downloaded from the World Wide Web on Oct. 24, 2001].
Fraunhofer-Gesellschaft, "MPEG-2 AAC," 3 pp. [Downloaded from the World Wide Web on Oct. 24, 2001].
Gill et al., "Creating High-Quality Content with Microsoft Windows Media Encoder 7," 4 pp. (2000). [Downloaded from the World Wide Web on May 1, 2002.].
Girod et al., "Advances in channel-adaptive video streaming," *Wireless Communications and Mobile Computing*, 24 pp. (Sep. 2002).
Guo et al., "Practical Wyner-Ziv Switching Scheme for Multiple Bit-Rate Video Streaming," *IEEE*, pp. 249-252 (Sep. 2006).
Hsu et al., "Joint Selection of Source and Channel Rate for VBR Video Transmission Under ATM Policing Constraints," IEEE Journal on Selected Areas in Communications, vol. 15, No. 6, pp. 1016-1028 (Aug. 1997).
Huang et al., "Optimal Control of Multiple Bit Rates for Streaming Media," Proc. Picture Coding Symposium, 4 pp. (Dec. 2004).
Jafarkhani et al., "Entropy-Constrained Successively Refinable Scalar Quantization," *IEEE Data Compression Conference*, pp. 337-346 (1997).
Jayant et al., "Digital Coding of Waveforms, Principles and Applications to Speech and Video," Prentice Hall, pp. 428-445 (1984).
Kalman et al., "Rate-Distortion Optimized Video Streaming with Adaptive Playout," Proc. Int'l Conf. on Image Processing, 4 pp (Jun. 2002).
Kammin et al., "Video multiplexing for the MPEG-2 VBR encoder using a deterministic method," Second Int'l Conf. on Automated Production of Cross Media Content for Multi-Channel Distribution, 8 pages (Dec. 2006).
Li et al., "Optimal Linear Interpolation Coding for Server-Based Computing," *Proc. IEEE Int'l Conf. on Communications*, 5 pp. (2002).
Mook, "Next-Gen Windows Media Player Leaks to the Web," *BetaNews*, 17 pp. (Jul. 19, 2002) [Downloaded from the World Wide Web on Aug. 8, 2003].
Naveen et al., "Subband Finite State Scalar Quantization," *IEEE Transactions on Image Processing*, vol. 5, No. 1, pp. 150-155 (Jan. 1996).
Ortega et al., "Adaptive Scalar Quantization Without Side Information," *IEEE Transactions on Image Processing*, vol. 6, No. 5, pp. 665-676 (May 1997).
Ortega et al., "Optimal Buffer-Constrained Source Quantization and Fast Approximation," *IEEE*, pp. 192-195 (1992).
Ortega et al., "Optimal Trellis-based Buffered Compression and Fast Approximation," IEEE Transactions on Image Processing, vol. 3, No. 1, pp. 26-40 (Jan. 1994).
Pao, "Encoding Stored Video for Streaming Applications," IEEE Transactions on Circuits and Systems for Video Technology, vol. 11, No. 2, pp. 199-209 (Feb. 2001).
Ramchandran et al., "Bit Allocation for Dependent Quantization with Applications to MPEG Video Coders," *IEEE*, pp. v-381-v-384 (1993).
Ratnakar et al., "RD-OPT: An Efficient Algorithm for Optimization DCT Quantization Tables," 11 pp.
Reader, "History of MPEG Video Compression—Ver. 4.0," 99 pp. (document marked Dec. 16, 2003).
Reed et al., "Constrained Bit-Rate Control for Very Low Bit-Rate Streaming-Video Applications," *IEEE Transactions on Circuits and Systems for Video Technology*, vol. 11, No. 7, pp. 882-889 (Jul. 2001).
Reibman et al., "Constraints on Variable Bit-rate Video for ATM Networks," IEEE Transactions on Circuits and Systems for Video Technology, No. 4, pp. 361-372 (1992).
Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).
Ronda et al., "Rate Control and Bit Allocation for MPEG-4," *IEEE Transactions on Circuits and Systems for Video Technology*, pp. 1243-1258 (1999).
Schulzrinne, "Operating System Issues for Continuous Media," *ACM Multimedia Systems*, vol. 4, No. 5, 13 pp. (1996).
Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).
Sheu et al., "A Buffer Allocation Mechanism for VBR Video Playback," Communication Tech. Proc. 2000, WCC-ICCT 2000, vol. 2, pp. 1641-1644 (2000).
Sidiropoulos, "Optimal Adaptive Scalar Quantization and image Compression," *ICIP*, pp. 574-578 (1998).

Srinivasan et al., "High-Quality Audio Compression Using an Adaptive Wavelet Packet Decomposition and Psychoacoustic Modeling," *IEEE Transactions on Signal Processing*, vol. 46, No. 4, pp. 1085-1093 (Apr. 1998).

Sullivan, "Optimal Entropy Constrained Scalar Quantization for Exponential and Laplacian Random Variables," *ICASSP*, pp. V-265-V-268 (1994).

Sullivan et al., "Rate-Distortion Optimization for Video Compression," *IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Trushkin, "On the Design on an Optimal Quantizer," *IEEE Transactions on Information Theory*, vol. 39, No. 4, pp. 1180-1194 (Jul. 1993).

Tsang et al., "Fuzzy based rate control for real-time MPEG video," 12 pp.

Walpole et al., "A Player for Adaptive MPEG Video Streaming over the Internet," Proc. SPIE, vol. 3240, pp. 270-281 (1998).

Westerink et al., "Two-pass MPEG-2 Variable-bit-rate Encoding," *IBM J. Res. Develop.*, vol. 43, No. 4, pp. 471-488 (1999).

Wong, "Progressively Adaptive Scalar Quantization," *ICIP*, pp. 357-360 (1996).

Wu et al., "Entropy-Constrained Scalar Quantization and Minimum Entropy with Error Bound by Discrete Wavelet Transforms in Image Compression," *IEEE Transactions on Image Processing*, vol. 48, No. 4, pp. 1133-1143 (Apr. 2000).

Wu et al., "Quantizer Monotonicities and Globally Optimally Scalar Quantizer Design," *IEEE Transactions on Information Theory*, vol. 39, No. 3, pp. 1049-1053 (May 1993).

Yang et al., "Rate Control for Videophone Using Local Perceptual Cues," *IEEE Transactions on Circuits and Systems for Video Tech.*, vol. 15, No. 4, pp. 496-507 (Apr. 2005).

Dai, "Rate-Distortion Analysis and Traffic Modeling of Scalable Video Coders," Dissertation, Texas A&M University, 172 pp. (Dec. 2004).

He et al., "A Unified Rate-Distortion Analysis Framework for Transform Coding," IEEE Transactions on Circuits and Systems for Video Technology, vol. 11, No. 12, pp. 1221-1236 (Dec. 2001).

Huang et al., "Optimal Coding Rate Control of Scalable and Multi Bit Rate Streaming Media," Microsoft Research Technical Report, MSR-TR-2005-47, 26 pp. (Apr. 2005).

Johansen, "Rate-Distortion Optimization for Video Communication in Resource Constrained IP Networks," Thesis, Norwegian University of Science and Technology, 161 pp. (Dec. 2007).

Ortega, "Optimal bit allocation under multiple rate constraints," Proc. of the Data Compression Conf., 10 pp. (Apr. 1996).

U.S. Appl. No. 11/260,650.
U.S. Appl. No. 09/771,371.
U.S. Appl. No. 10/017,694.
U.S. Appl. No. 11/066,859.
U.S. Appl. No. 11/067,018.
U.S. Appl. No. 11/066,860.
U.S. Appl. No. 11/066,898.
U.S. Appl. No. 11/066,897.
U.S. Appl. No. 11/067,170.
U.S. Appl. No. 11/260,027.
U.S. Appl. No. 11/599,686.
U.S. Appl. No. 10/623,338.
U.S. Appl. No. 10/622,822.
U.S. Appl. No. 12/004,909.
U.S. Appl. No. 12/119,364.
U.S. Appl. No. 12/116,878.
U.S. Appl. No. 12/242,524.
U.S. Appl. No. 12/188,074.
U.S. Appl. No. 12/188,079.
U.S. Appl. No. 12/188,085.
U.S. Appl. No. 12/188,087.

Agarwal et al., "Optimal Buffering Policy for Downloading Music in Heterogeneous Wireless Networks," *Wireless Communications and Networking Conference*, vol. 1, pp. 337-341 (Mar. 17-21, 2002).

Chang et al., "BubbleUp: Low Latency Fast-Scan for Media Servers," *Fifth ACM International Conference on Multimedia 1997*, 12 pp. (Nov. 1997).

Chavez et al., "Monitoring-Based Adaptive Overlay Streaming Media," printed from http://www.eecs.berkeley.edu/Programs/ugrad/superb/papers2003/Brian%20Chavez.pdf on Aug. 12, 2008.

Guo et al., "P2Cast: Peer-to-peer Patching Scheme for VoD Service," *Proc. of the 12th International Conf. on World Wide Web*, pp. 301-309 (2003).

Huang et al., "Adaptive Live Video Streaming by Priority Drop," *Proc. of the IEEE Conf. on Advanced Video and Signal Based Surveillance*, pp. 342-347 (Jul. 21-22, 2003).

Microsoft TechNet, "Streaming Media Services Role," 3 pp. (Jan. 2008).

Qazzaz et al., "Providing Interactive Video on Demand Services in Distributed Architecture," *29th Proc. of the Euromicro Conf.*, pp. 215-222 (Sep. 1-6, 2003).

Reibman et al., "Video Quality Estimation for Internet Streaming," *Int'l Conf. on World Wide Web*, pp. 1168-1169 (2005).

Srinivasan et al., "Windows Media Video 9: Overview and Applications," *Signal Processing: Image Communication*, vol. 19, pp. 851-875 (Oct. 2004).

Sun et al., "Seamless Switching of Scalable Video Bitstreams for Efficient Streaming," *IEEE Transactions on Multimedia*, vol. 6, No. 2, pp. 291-303 (Apr. 2004).

Wu et al., "SMART: An Efficient, Scalable and Robust Streaming Video System," *EURASIP on Applied Signal Processing*, vol. 2, 39 pp. (Feb. 2004).

Zhang et al., "Seamless Bit-Stream Switching in Multirate-Based Video Streaming Systems," *EURASIP Journal on Applied Signal Processing*, pp. 1-11 (2006).

Zheng et al., "Multimedia Over High Speed Networks: Reducing Network Requirements with Fast Buffer Fillup," *IEEE GLOBECOM-98*, 6 pp. (Nov. 1998).

\* cited by examiner

Software 180 Implementing Tools and
Techniques of Encoding a Segment of Audio or
Video as a High Bit Rate Layer, a Low Bit Rate
Layer, and One or More Intermediate Bit Rate
Layers.

ENCODING STREAMING MEDIA AS A HIGH BIT RATE LAYER, A LOW BIT RATE LAYER, AND ONE OR MORE INTERMEDIATE BIT RATE LAYERS

BACKGROUND

With the increasing popularity of playing streaming audio and video over networks such as the internet, there is a need for optimizing the data transferred from a server to a client such that the client's experience is maximized even if network conditions during playback are inconsistent. Optimizing the client's experience involves choosing a quality level for encoding the audio and video portions of the video playback such that the video can be transferred and reconstructed with a minimal number of errors.

The quality level is generally dictated by the bit rate specified for the encoded audio or video portions of the input stream. A higher bit rate generally indicates that a larger amount of information about the original audio or video is encoded and retained, and therefore a more accurate reproduction of the original input audio or video will be presented during video playback. Conversely, a lower bit rate indicates that less information about the original input audio or video is encoded and retained, and thus a less accurate reproduction of the original audio or video will be presented during video playback.

Generally, the bit rate is specified for encoding each of the audio and video based on several factors. The first factor is the network condition between the server and the client. A network connection that can transfer a high amount of data indicates that a higher bit rate can be specified for the input video that is subsequently transferred over the network connection. The second factor is the desired start-up latency. Start-up latency is the delay that a video playback tool experiences when first starting up due to the large amount of data that has to be received, processed, and buffered. The third factor is the tolerance to glitching. Glitching is when video playback has to stop because data is missing. In most cases any amount of start-up latency or glitching is intolerable, and it is therefore desirable to optimize the bit rate specified such that the start-up latency and the glitching are minimized or eliminated.

SUMMARY

In summary, the following detailed description provides tools and techniques for encoding input video at a plurality of different bitrates so as to optimize video transfer and playback.

In one embodiment an encoding tool performs a method of encoding a sequence of frames. Specifically, the method comprises encoding a segment made up of a plurality of frames. The segment is encoded as both a high bit rate layer and a low bit rate layer. The encoding tool then produces one or more intermediate bit rate layers between the high and the low bit rate layer, and encodes the segment as each of the intermediate bit rate layers. The encoding tool then outputs the encoded bit rate layers.

In certain embodiments the bit rate of the low bit rate layer is selected such that each of a plurality of encoded segments is encoded at or below the minimum supported bit rate. In some embodiments, the bit rate of the high bit rate layer for each of the segments is selected such that each of the segments is encoded at or above an acceptable quality threshold. In certain embodiments the bit rates of the intermediate bit rate layers are produced by applying a bit rate factor to the bit rate of an existing bit rate layer such as the high bit rate layer, the low bit rate layer, or one of the intermediate bit rate layers.

In some embodiments, each of the segments comprises the same number of frames, and in other embodiments the segments can each comprise a different number of frames.

The foregoing and other objects, features, and advantages of the invention will become more apparent from the following detailed description, which proceeds with reference to the accompanying figures.

DETAILED DESCRIPTION

One way to adjust the bit rate is to divide the input video into units which are coded independently from each other, so that the dependency across the units is only based upon the lowest bit rate. For the purposes of seeking, such as skipping the playback forward or backward in time, it is generally desirable for the units to be completely independent from each other so the playback tool does not rely on a previous component during skipping. If the tool did rely on a previous component then this could lead to the playback tool downloading or reconstructing the previous component multiple times, resulting in inefficiencies that could cost time or memory.

For video, these independencies can be achieved by using a closed group of pictures (GOP) for each unit comprising a number of video frames. The GOP is generally referred to as a segment. For audio, there is typically no dependency across frames (such as in the Windows Media Audio format, for example) except for the overlap-add, so the audio segments can simply be considered to be some number of audio frames.

I. Computing Environment.

Figure 1:
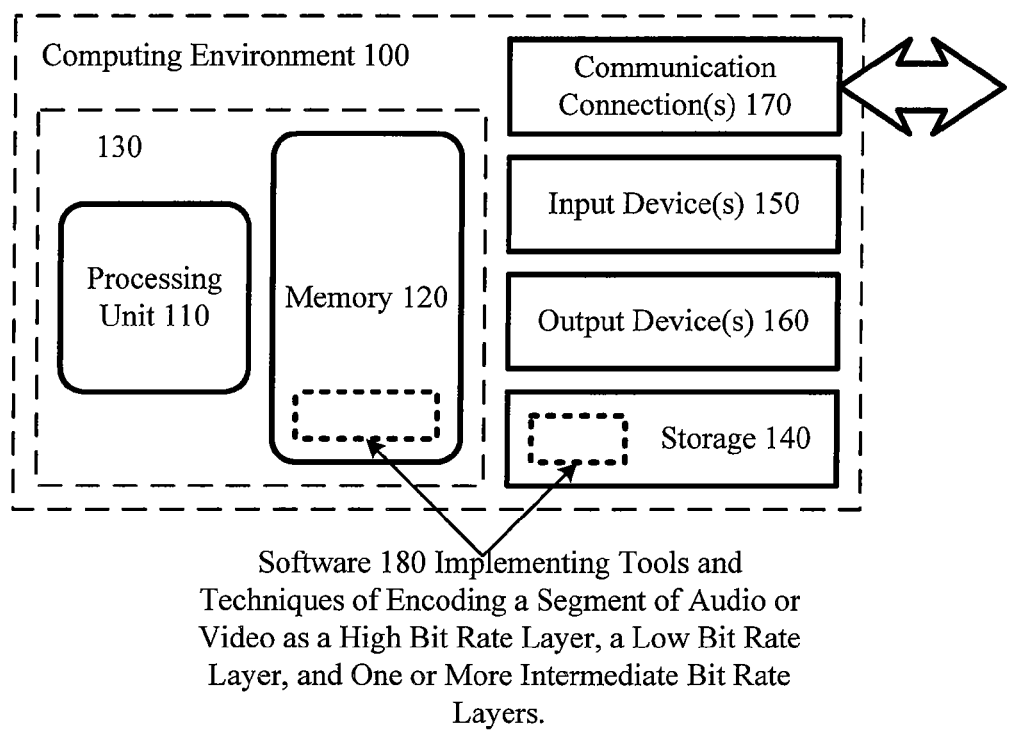
FIG. 1 is a block diagram of a suitable computing environment in which several described embodiments may be implemented.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing an encoder with one or more of the described techniques and tools for encoding an input video stream as a high bitrate layer, a low bitrate layer, and one or more intermediate bitrate layers.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the video encoder and/or decoder.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "produce" and "encode" to describe computer operations in a computing environment. These terms are high-level abstractions for operations performed by a computer, and should not be confused with acts performed by a human being. The actual computer operations corresponding to these terms vary depending on implementation.

II. Generalized Encoding Tool.

Figure 2:
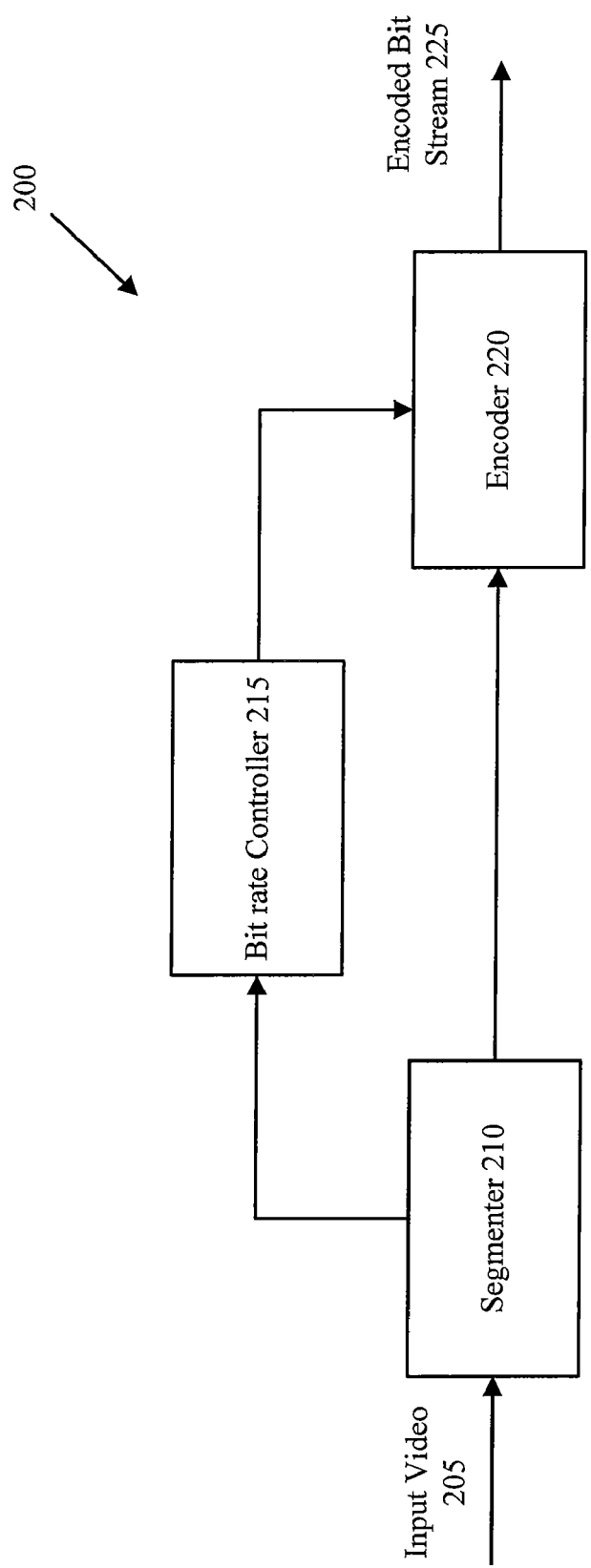
FIG. 2 is a block diagram of a generalized video encoding tool for encoding video as a high bit rate layer, a low bit rate layer, and one or more intermediate bit rate layers.

FIG. 2 illustrates an exemplary encoding tool (200) according to the present disclosure. This encoding tool may be implemented as a software module on a computer, a hardware module on a computer, a stand-alone piece of hardware, or in some other manner. The tool includes a segmenter (210) that accepts input video (205) and splits the input video into a plurality of segments each comprising a certain number of frames. Input video generally refers to a stream comprising both audio components and video components. In certain embodiments, the segments each comprise 60 frames. In other embodiments the segments can vary across a range of values such as comprising between 30 frames to 90 frames. The number of frames in the segment can be based on factors such as scene changes in the input video (205). For example, if a segment contains a scene change, the frames before the scene change could be drastically different than the frames after the scene change. Subsequent entropy encoding of this segment would be very inefficient. In that case, it would be desirable to alter the length of the segment such that it did not contain a scene change and encoding could be done more efficiently.

The segmenter (210) outputs the segments to a bit rate controller (215). The bit rate controller (215) analyzes each segment and selects bit rates for one or more bit rate layers for each of the segments. A bit rate layer is a layer comprising a specific bit rate used to encode the input video (205). The number of bit rate layers and their respective bit rates for each segment may be affected by factors associated with the segment such as the number of frames in the segment or the complexity of the input video (205) in the given segment. Additionally, the number of bit rate layers and their corresponding bit rates may be affected by factors not associated with the given segment such as limits on the size of the file or the maximum or minimum bandwidth of the network that the encoded input video (205) will be transferred through. In one embodiment, the bit rate controller (215) selects the bit rates for the bit rate layers for each of the segments independently from each of the other segments. Thus, a given segment may be encoded at the same or different bit rates as any other segment.

The segmenter (210) also outputs the segments to an encoder (220), and the bit rate controller (215) signals the bit rate layers for each segment to the encoder (220). The encoder (220) can encode according to a Windows Media Video or VC-1 format, MPEG-x format (e.g., MPEG-1, MPEG-2, or MPEG-4), H.26x format (e.g., H.261, H.262, H.263, or H.264), or other format. The encoder (220) may also be able to encode according to one or more audio standards such as WAV, FLAC, MP3, WMA, or some other standard. In some embodiments the encoder (220) encodes each segment as each bit rate layer and outputs a series of chunks in an encoded bit stream (225). Generally speaking, a chunk is a segment encoded as a particular bit rate layer. Thus, the encoder (220) will produce one or more chunks for each segment. In other embodiments, the encoder may encode the segment with less than all of the available bit rate layers. This may occur if, for example, a user defines a certain amount of time available for encoding, or conditions make certain bit rate layers un-necessary or undesirable.

In certain embodiments, the encoding tool (200) may include a splitter (not shown) that splits the input video (205) into a separate video component and an audio component. In these embodiments, a separate segmenter, bit rate controller and encoder can be used to encode each of the video component and the audio component. The encoder for the video component can encode according to WMV or VC-1 format, MPEG-x format, H.26x format, or some other format. The encoder for the audio component can encode according to WAV, FLAC, MP3, WMA, or some other standard. Additionally, the segments for the video component and the segments for the audio component may be selected independently of each other. In this embodiment the segments of the video component may, but do not have to, comprise the same frames as the segments of the audio component.

Figure 3:
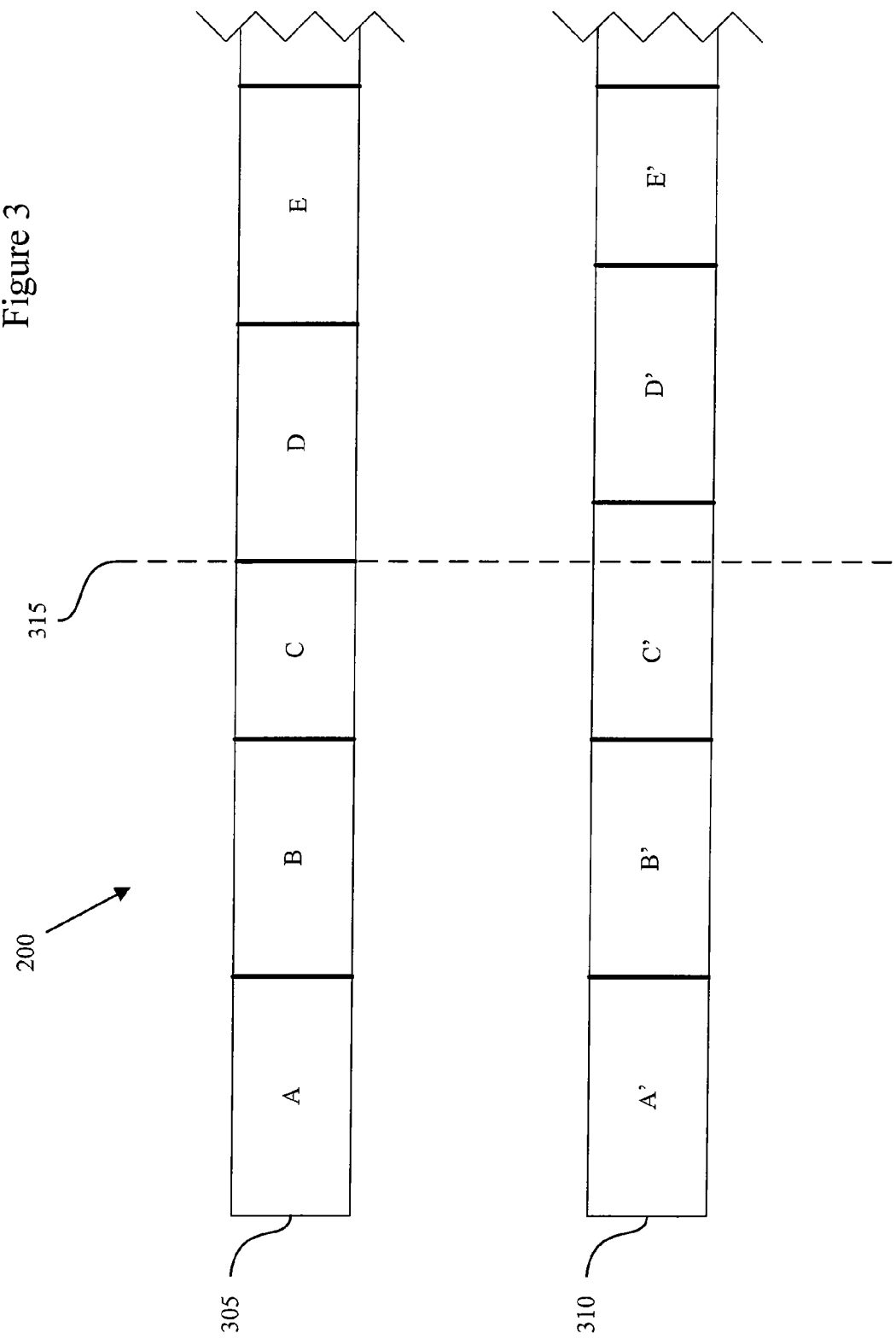
FIG. 3 is a flow chart of a generalized technique for encoding video as a high bit rate layer, a low bit rate layer, and one or more intermediate bit rate layers.

FIG. 3 illustrates an input stream (300) comprising a video stream (305) and an audio stream (310). The encoding tool, such as the tool (200) described in FIG. 2, splits the video stream (305) and the audio stream (310) into segments A, B, A', and B', respectively. Segments A and A' comprise the same number of frames as each other, and segments B and B' comprise the same number of frames as each other. When the encoding tool begins to split the video stream (305) into segment C, however, a scene change (315) occurs. Because encoding a segment with a scene change would not be optimal, segment C is chosen to comprise less frames than an average segment such as, for example, segments A and B. Segment C' in the audio stream (310), however, could still comprise the same number of frames as segments A' or B', however. Thus, segments C and C' would not comprise the same number of frames as each other. The next segments, D and D', then would not begin and end at the same time as each other.

In one embodiment, it may be desirable for the encoding tool to slightly shorten or lengthen a following segment in the case of a segment offset as described above. Segment E' is slightly shortened so that segment E ends at the same time as segment E'. In another embodiment the encoding tool may not correct segment offset. Additionally, the scene change (315) caused segment C to be shorter than the preceding segments in this embodiment, but it could be equally likely that the scene change could cause the segments to be slightly lengthened. In one embodiment each segment comprises about 60 frames, but could comprise as few as about 30 frames or as many as about 90 frames. In other embodiments the average, minimum, or maximum for each segment could be some other number. Additionally, in one embodiment a segment of about 60 frames is comprised of 30 frames per second, so a segment of about 60 frames takes 2 seconds to play. In other embodiments the segments may be comprised of 24 frames per second, 20 frames per second, or some other number.

III. General Techniques for Encoding Segments as a High Bit Rate Layer, a Low Bit Rate Layer, and One or More Intermediate Bit Rate Layers.

Figure 4:
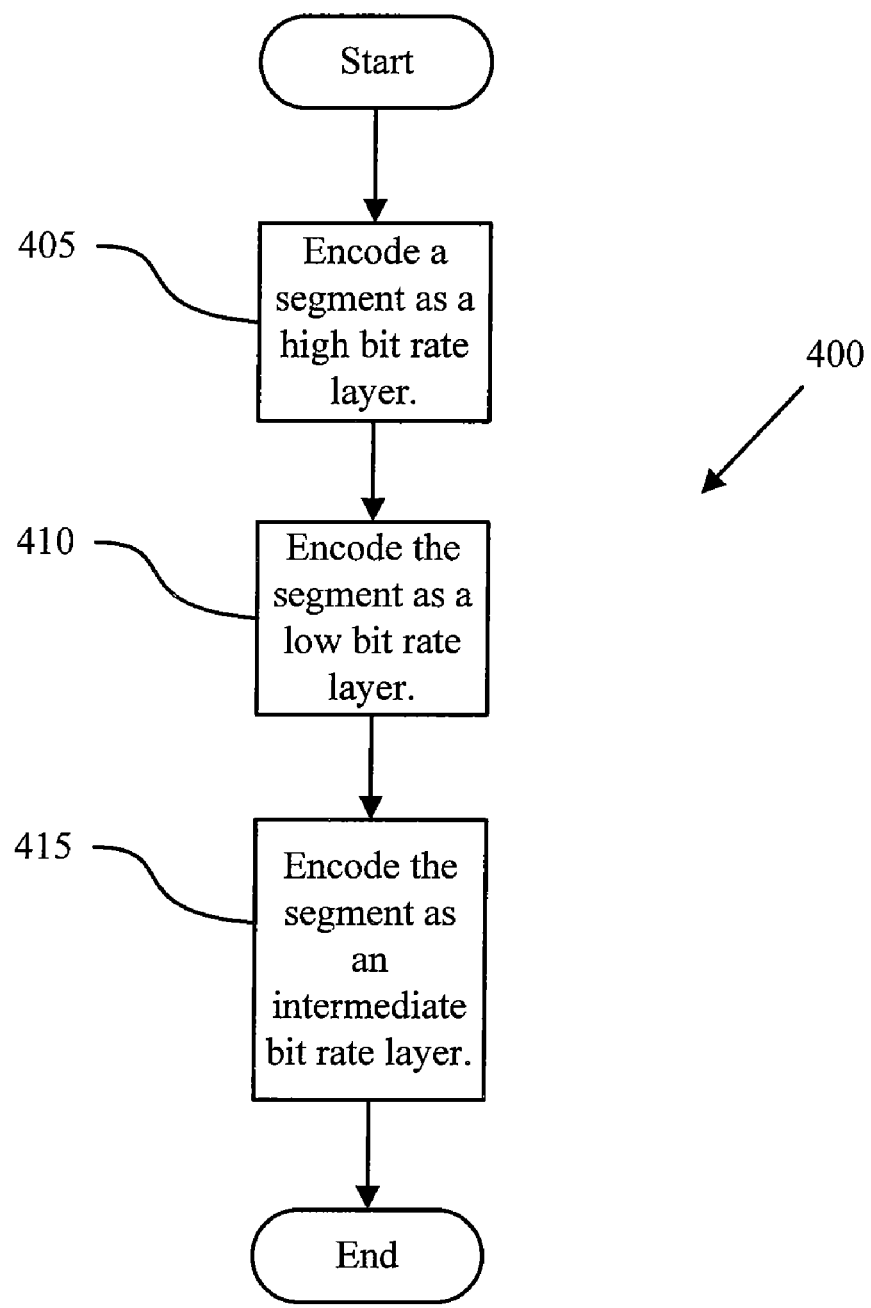
FIG. 4 is a flow chart for an exemplary technique for encoding video as a high bit rate layer, a low bit rate layer, and one or more intermediate bit rate layers.

FIG. 4 shows a flow chart for a general technique (400) of encoding a segment of the input video. The technique could be performed by an encoding tool such as that shown in FIG. 2, and may be performed on one or both of the audio portion of an input video stream or the video portion of the input video stream.

The encoder encodes (405) the segment first as a high bit rate layer. Generally, if the video stream comprises multiple segments, the bit rate of the high bit rate layer for each segment is chosen independently from the bit rate of the high bit rate layer of the other segments. The bit rate of the high bit rate layer is generally chosen to be the bit rate which produces an encoded segment that, when reconstructed and played back on a video player, provides playback at or above an acceptable quality level. This quality level can be chosen according to a variety of criteria such as signal to noise ratio, a sum of squares threshold, or some other quality measuring threshold. The high bit rate will generally vary from segment to segment because bit rate is dependant upon the spatial or temporal complexity of the segment.

The encoder then encodes (410) the same segment as a low bit rate layer. The bit rate of the low bit rate layer is generally chosen to be less than or equal to a minimum supported bit rate. For example, if the lowest supported bit rate supported by the network is 200 Kbps, then each chunk should not exceed 200 Kbps. A first segment will thus produce a first chunk when encoded at the low bit rate that is the same size as a second chunk produced from a second segment that has the same number of frames as the first segment, regardless of the spatial or temporal complexity of the first or second segments.

By encoding (405, 410) as the high and low bit rate layers, the tool thus ensures that there is always a chunk that produces acceptable visual quality when reconstructed and played back, and a chunk that is always able to be transmitted over the lowest supported bit rate. However, the bit rate of the high bit rate layer may be substantially higher than the bit rate of the low bit rate layer, and so the tool encodes (415) the segment as one or more intermediate bit rate layers. Depending on network conditions, the connection between the server and the client may be able to support a bit rate that is higher than the bit rate of the low bit rate layer, but not as high as the bit rate of the high bit rate layer. In this instance one or more intermediate bit rates may produce a chunk that is optimal for the given conditions at the time that chunk is transferred. For example, if the low bit rate is 200 Kbps, and the high bit rate is 1000 Kbps, chunks may be produced using a bit rate of 342 Kbps and 585 Kbps. Thus, if the network connection between the server and the client momentarily drops in quality and only supports a bit rate of 600 Kbps, then the chunk encoded using a bit rate of 585 Kbps would be transmitted. This chunk would have substantially better quality than the chunk encoded at 200 Kbps when reconstructed and played at the client and thus would be a closer to optimal chunk for the given network conditions at that point in time.

The above described generalized technique (400) is only one embodiment of a method of encoding an input video stream at a high bit rate and a low bit rate. The method of selecting or producing the high, low, or intermediate bit rate layers may vary in a different embodiment of the present disclosure. Additionally, certain steps may be performed in a different order, or omitted entirely.

IV. An Exemplary Technique for Encoding Segments as a High Bit Rate Layer, a Low Bit Rate Layer, and One or More Intermediate Bit Rate Layers.

Figure 5:
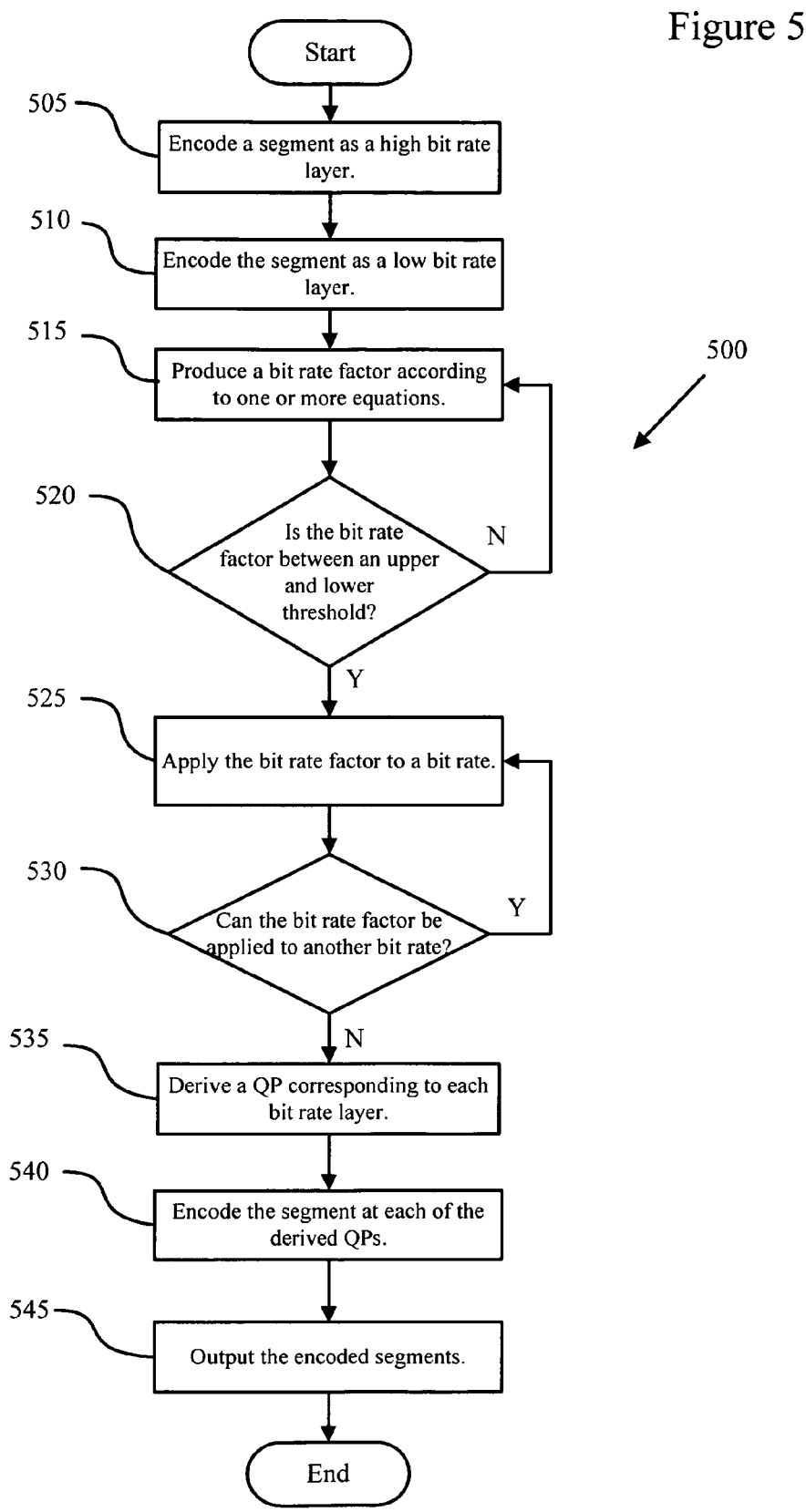
FIG. 5 is an exemplary diagram of how an audio stream and a video stream may be split into segments according to the present disclosure.

FIG. 5 shows a flow chart illustrating an exemplary method (500) of encoding a segment as a high bit rate layer, a low bit rate layer, and one or more intermediate bit rate layers. The technique could be performed by an encoding tool such as that shown in FIG. 2, and may be performed on one or both of the audio component of an input video stream or the video component of the input video stream. Additionally, certain steps of the method (500) could be performed in a different order, or omitted entirely.

Generally, the bit rate of a layer is inversely proportional to the quantization parameter (QP) that is used to quantize the picture. A lower quantization parameter will increase the amount of information that is retained from the original picture, and thereby increase the size of the quantized and encoded picture resulting in a higher bit rate being necessary to transfer the encoded picture. The encoding tool first quantizes (505) the input video at a high bit rate, and produces the QP that corresponds to that high bit rate layer. This QP is generally relatively low. In one embodiment, the bit rate of the high bit rate layer is selected by performing a 2-pass average bit rate constrained constant quality variable bit rate (VBR) encoding of the entire input video stream. In this embodiment, a total size constraint for the entire compressed input video stream exists, so that the size of the compressed video stream is kept within reasonable limits. In other embodiments the total size of the compressed input video may be unconstrained, and so a 1-pass constant quality VBR encoding of the entire input video stream is performed. The bit rate of the high bit rate layer for the segment is chosen such that the segment is able to be reconstructed and played back at or above a specified quality threshold. The quality threshold may be supplied by the source code or by user definition, or the quality threshold may be selected at least in part based upon the maximum size of the encoded video stream.

The bit rate of the high bit rate layer is chosen on a segment-by-segment basis. The quality may be determined according to a threshold such as a sum-of-squares threshold or a signal-to-noise ratio threshold. The QP for the segment will then be chosen as the QP that corresponds to encoding the segment as the high bit rate layer. A lower QP and correspondingly higher bit rate will be necessary for frames with a high degree of spatial and/or temporal complexity. In other embodiments, the bit rate of the high bit rate layer may be selected according to a different method of encoding such as single-pass VBR or a constant bit rate (CBR). Additionally, in other embodiments the total size of the encoded input stream will not be constrained to a specific size.

The encoding tool then quantizes (510) the segment as a relatively low bit rate layer, which corresponds to a relatively high QP. In one embodiment, the bit rate of the low bit rate layer is selected by performing a 2-pass average bit rate constrained constant quality VBR encode using the minimum supported network bit rate as the size target. Generally, the bit rate of the low bit rate layer will be selected such that each segment in the input video stream can be encoded with the same bit rate, regardless of spatial or temporal complexity. In other embodiments the bit rate of the low bit rate layer may be selected according to a different method of encoding such as single-pass VBR or CBR.

The encoding tool next produces (515) a bit rate factor according to one or more equations. The bit rate factor is a ratio of bit rates which, when applied to a bit rate of an existing bit rate layer, produces a bit rate of an intermediate bit rate layer. For example, the bit rate factor may be applied to the bit rate of the low bit rate layer to produce a bit rate of a first intermediate bit rate layer. Then, the bit rate factor may then be applied to the bit rate of the first intermediate bit rate layer to produce a bit rate of a second intermediate bit rate layer and so on.

In one embodiment, the bit rate factor $f$ is a function of L, the bit rate of the low bit rate layer; H, the bit rate of the high bit rate layer; and N, the total number of bit rate layers for a segment. Equation 1 describes the relationship:

$$L \times f^{(N-1)} = H \quad \text{(Equation 1)}$$

In this embodiment the bit rate of the intermediate bit rate layer should be between 50% and 100% larger than the next lower bit rate, so $f$ must be in the range of 1.5 to 2.0. Therefore, solve Equation 1 for $f$ as shown in Equation 2 and iteratively increase N until $f$ is between 1.5 and 2.0.

$$f = \left(\frac{H}{L}\right)^{\frac{1}{N-1}} \quad \text{(Equation 2)}$$

Using Equation 2, the tool produces (515) a bit rate factor. The tool then checks (520) whether the bit rate factor is between an upper and lower range, in this example 1.5 to 2.0. If the bit rate factor is not between the upper and lower threshold, the tool then produces (515) another bit rate factor. By way of example, presume that the lowest bit rate is 200 Kbps, and the highest bit rate is 1 Mbps. Using equation 2, if N=2, then $$f = \left(\frac{1000}{200}\right)^{\frac{1}{2-1}} = (5.00)^1 = 5.00$$

5.00 is not between the range of 1.5 to 2, so Equation 2 is applied with N=3 which results in $f$=2.23. For N=4, $f$=1.71. 1.71 is between the range of 1.5 to 2, so 1.71 is the bit rate factor.

The encoding tool applies (525) the bit rate factor to the bit rate of the low bit rate layer to produce the bit rate of the first intermediate bit rate layer. In this example, the factor 1.71 is applied to the low bit rate of 200 Kbps to give a first intermediate bit rate of 1.71×200 Kbps=342 Kbps. The encoding tool checks (530) to see if the bit rate factor can be applied to the first intermediate bit rate to produce a second intermediate bit rate. In this example, it can be used so the tool applies (525) the bit rate factor to the bit rate of the first intermediate bit rate layer to give a second intermediate bit rate of 1.71×342 Kbps=585 Kbps. The tool again checks (530) to see if the encoding factor can be applied to the bit rate of the second intermediate bit rate layer. In this example the encoding factor is not applied to the second intermediate bit rate because 585×1.71=1000.35 Kbps. Because the bit rate of the high bit rate layer is 1 Mbps, and each bit rate layer is specified to be between 50% and 100% of an existing bit rate layer, the bit rate of 1000.35 Kbps is undesirable in this instance, and therefore the segment would not be encoded as that bit rate layer. The tool would signal that all of the bit rates of the bit rate layers had been selected, in the case of the high and low bit rate layers, or produced, in the case of the one or more intermediate bit rate layers. In an alternative embodiment, the bit rate factor can be applied to the bit rate of the high bit rate layer to produce decreasing intermediate bit rate layers rather than increasing intermediate bit rate layers. Additionally, other equations involving different factors may be used to produce the intermediate bit rate layers. In certain embodiments the bit rates of each bit rate layer can be less than 50% larger or greater than 100% larger than the bit rates of existing bit rate layers.

The tool then selects (535) the QPs necessary to encode the segment as each of the selected bit rate layers. Generally, because the QP is inversely proportional to the bit rates of the bit rate layers, the bit rate factor is applied to each of the QPs. Using the example described above, if a QP of 4 corresponds to the highest bit rate of 1 Mbps, and a QP of 20 corresponds to the lowest bit rate of 200 Kbps, then the QP corresponding to 585 Kbps would be 4×1.71=6.84. The QP corresponding to 342 Kbps would be 6.84×1.71=11.70. The QP is required to be a whole number, so the QPs would be rounded to 7 and 12, respectively.

In certain embodiments, the QP corresponding to the lowest bit rate layer may not be within a range of pre-set allowable QPs. This range may be defined in the source code or according to one or more user instructions. In this instance, the frames within the segment may have to be downsampled.

One way to downsample the frames in the segment is to decrease the resolution of the frames. In general, the compressed size of a chunk is inversely proportional to the QP used to encode the segment, and directly proportional to the spatial sampling rate, or resolution, of the segment. For example, one way of halving the size of a chunk would be to double the QP. Another way to halve the size of the chunk would be to halve the resolution. Alternatively, both the size of the QP and the resolution could be altered in some combination that resulted in multiplying the bit rate by a factor of ½. The choice of whether to adjust QP, resolution, or both should be made on the basis of what gives the best perceptual quality when the chunk is reconstructed. This perceptual quality can be based on some threshold such as signal-to-noise ratio, a sum-of-squares threshold, or some other threshold.

The tool then encodes (540) the segment as each of the bit rate layers using the corresponding QP for each. The encoder for the video stream can encode according to WMV or VC-1 format, MPEG-x format, H.26x format, or some other format. The encoder for the audio stream can encode according to WAV, FLAC, MP3, WMA, or some other standard. After the encoding tool has encoded (540) a segment as each of the bit rate layers and QPs, the encoding tool outputs (545) the encoded chunks.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising a processing unit, memory and storage containing instructions which, when executed by the processing unit, cause the system to perform a method of encoding a sequence of frames organized as plural segments, each of the plural segments comprising a plurality of the frames, the method comprising:
    selecting a low bit rate at which to encode a given segment of the plural segments for a low bit rate layer, wherein the low bit rate is identical for each of the plural segments;
    selecting a high bit rate at which to encode the given segment for a high bit rate layer, wherein the high bit rate is set for the plural segments on a segment-by-segment basis depending on complexity of the given segment and a quality threshold for encoding;
    selecting one or more intermediate bit rates between the low bit rate and the high bit rate at which to encode the given segment for one or more intermediate bit rate layers, respectively, wherein a number of intermediate bit rate layers is variable depending on the high bit rate for the given segment;
    encoding the given segment at the high bit rate to produce a high bit rate chunk for the given segment;
    encoding the given segment at the low bit rate to produce a low bit rate chunk for the given segment;
    encoding the given segment at each of the one or more intermediate bit rates to produce one or more intermediate bit rate chunks for the given segment; and
    outputting the high bit rate chunk, the low bit rate chunk, and the one or more intermediate bit rate chunks for the given segment.

2. The system of claim 1 wherein the low bit rate is selected based on a lowest supported bit rate regardless of complexity of the given segment.

3. The system of claim 1 wherein the high bit rate is selected based upon a bit rate that provides quality at or above the quality threshold.

4. The system of claim 3 wherein each of the one or more intermediate bit rates is produced by applying a bit rate factor to a next lower bit rate to obtain the intermediate bit rate.

5. The system of claim 4 wherein the bit rate factor is in the range of 1.5 to 2.0.

6. The system of claim 1 wherein the one or more intermediate bit rates are chosen such that a highest intermediate bit rate is between one-half to two-thirds of the high bit rate.

7. The system of claim 1 wherein the plurality of frames in the given segment is produced based upon a pre-determined number of frames.

8. The system of claim 1 wherein the plurality of frames in the given segment is a variable number of frames from segment to segment.

9. The system of claim 1 wherein bit rate is decreased by performing at least one of:
    increasing a quantization parameter of the given segment; and
    decreasing a spatial resolution parameter of the given segment.

10. The system of claim 1 wherein the method further comprises delivering to a client one of the low bit rate chunk, the high bit rate chunk and the one or more intermediate bit rate chunks for the given segment.

11. A method of encoding a plurality of frames comprising:
    selecting plural segments each comprising a portion of the plurality of frames;
    selecting a lowest bit rate at which to encode each of the plural segments for a lowest bit rate layer, wherein the lowest bit rate is identical for each of the plural segments;
    for each given segment of the plural segments:
        selecting a highest bit rate at which to encode the given segment for a highest bit rate layer, wherein the highest bit rate is set on a segment-by-segment basis depending on complexity of the given segment and a quality threshold for encoding, and wherein the highest bit rate is variable among the plural segments; and
        selecting one or more intermediate bit rates between the lowest bit rate and the highest bit rate at which to encode the given segment for one or more intermediate bit rate layers, respectively, wherein a number of intermediate bit rate layers is variable depending on the highest bit rate for the given segment;
    encoding each of the plural segments according to the lowest bit rate and their respective highest bit rate and one or more intermediate bit rates to produce a lowest bit rate chunk, a highest bit rate chunk and one or more intermediate bit rate chunks for the segment;
    and for each of the plural segments, outputting the lowest bit rate chunk, the highest bit rate chunk and the one or more intermediate bit rate chunks for the segment.

12. The method of claim 11 wherein each of the plural segments generally comprises the same number of frames.

13. The method of claim 11 wherein number of frames per segment is variable for the plural segments.

14. The method of claim 11 wherein the lowest bit rate is selected based upon a network connection and regardless of complexity of the plural segments, respectively.

15. The method of claim 11 wherein the highest bit rate for a given segment is a bit rate that produces quality at or above a quality threshold.

16. The method of claim 15 wherein the quality threshold is signaled by a user.

17. The method of claim 15 wherein the quality threshold is signaled in source code.

18. The method of claim 11 wherein the one or more intermediate bit rates for a given segment are chosen such that each one of the one or more intermediate bit rates is in the range of 1.5 to 2.0 times a lower bit rate.

19. The method of claim 11 wherein bit rate is increased by performing at least one of:
- decreasing a quantization parameter; and
- increasing a spatial resolution parameter.

20. The method of claim 11 wherein each of the plural segments is encoded independent of other ones of the plural segments.

21. The method of claim 11 wherein the lowest bit rate is set regardless of complexity of the plural segments, respectively.

22. The method of claim 11 further comprising, for each of the plural segments, delivering to a client one of the lowest bit rate chunk, the highest bit rate chunk and the one or more intermediate bit rate chunks for the segment.

23. A system for encoding a plurality of frames comprising:
- a buffer for storing digital media data;
- a segmenter for splitting the plurality of frames into plural segments; and
- an encoder operable to:
  - encode each of the plural segments at a low bit rate to produce a low bit rate chunk for that segment for a low bit rate layer, wherein the low bit rate is identical for each of the plural segments and set regardless of complexity of the plural segments, respectively;
  - encode each of the plural segments at a high bit rate at which that segment has quality above a threshold for encoding to produce a high bit rate chunk for that segment for a high bit rate layer, wherein the high bit rate is set on a segment-by-segment basis depending on the threshold for encoding and the complexity of the plural segments, respectively; and
  - encode each of the plural segments at one or more intermediate bit rates to produce one or more intermediate bit rate chunks for that segment for one or more intermediate bit rate layers, respectively, wherein a number of intermediate bit rate layers varies depending on the high bit rate for each of the plural segments.

24. The system of claim 23 wherein, for each of the plural segments, an intermediate bit rate is in the range of 1.5 to 2.0 times a lower bit rate, and bit rate is increased by performing at least one of decreasing a quantization parameter and increasing a spatial resolution parameter of the segment.

* * * * *